United States Patent
Wyville (10) Patent No.: US 9,020,065 B2
(45) Date of Patent: Apr. 28, 2015

(54) RADIO FREQUENCY DIGITAL FILTER GROUP DELAY MISMATCH REDUCTION

(75) Inventor: Mark William Wyville, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 520 days.

(21) Appl. No.: 13/351,008

(22) Filed: Jan. 16, 2012

(65) Prior Publication Data
US 2013/0182792 A1    Jul. 18, 2013

(51) Int. Cl.
H04K 1/02      (2006.01)
H04L 25/03     (2006.01)
H04L 25/49     (2006.01)
H04B 1/04      (2006.01)

(52) U.S. Cl.
CPC ..................................... H04B 1/0475 (2013.01)

(58) Field of Classification Search
CPC ................. H04L 25/03057; H04L 2025/0349; H04L 25/03267; H03H 21/0012
USPC ................. 375/216, 233, 296, 360; 333/24 R
See application file for complete search history.

(56) References Cited

U.S. PATENT DOCUMENTS

| | | | | |
|---|---|---|---|---|
| 4,450,417 A | * | 5/1984 | Folkmann | 333/24 R |
| 4,872,127 A | * | 10/1989 | Nolan | 708/3 |
| 5,652,770 A | * | 7/1997 | Eatwell | 375/350 |
| 8,165,548 B2 | * | 4/2012 | Kon et al. | 455/226.1 |
| 8,363,574 B2 | * | 1/2013 | Longobardi et al. | 370/260 |
| 2004/0232953 A1 | * | 11/2004 | Ferianz et al. | 327/112 |
| 2005/0127996 A1 | * | 6/2005 | Jelonnek et al. | 330/151 |
| 2008/0112570 A1 | * | 5/2008 | Asada et al. | 381/71.6 |
| 2012/0224849 A1 | * | 9/2012 | Rylyakov et al. | 398/27 |
| 2013/0182792 A1 | * | 7/2013 | Wyville | 375/296 |

FOREIGN PATENT DOCUMENTS

| | | |
|---|---|---|
| EP | 1 921 603 A2 | 5/2008 |
| EP | 2 259 250 A1 | 8/2010 |
| WO | WO 2008147769 A2 | 12/2008 |
| WO | 2010063096 A1 | 6/2010 |
| WO | 2010063097 A1 | 6/2010 |

OTHER PUBLICATIONS

International Search Report and Written Opinion dated Apr. 12, 2013 for International Application No. PCT/IB2012/057045; International Filing Dated: Dec. 6, 2012 consisting of 14-pages.

(Continued)

Primary Examiner — Shuwang Liu
Assistant Examiner — Sung Ahn
(74) Attorney, Agent, or Firm — Christopher & Weisberg, P.A.

(57) ABSTRACT

A radio frequency (RF) front end having group delay mismatch reduction is provided. One embodiment provides a first feed forward path and a second feed forward path. The second feed forward path is electrically in parallel with the first feed forward. The second feed forward path has a first signal path and a second signal path. The first and second signal paths are arranged to be electrically in parallel. The first signal path has a digital filter. The second signal path has a tunable analog filter. The tunable analog filter operates to reduce a delay associated with the second feed forward path as compared with a delay associated with the first feed forward path.

17 Claims, 5 Drawing Sheets

(56) References Cited

OTHER PUBLICATIONS

Wyville, M., "Hybrid RF-Digital Feed-Forward Filter for High-Order Frequency Agile Filtering," Unpublished doctoral dissertation, Ottawa-Carleton Institute for Electrical and Computer Engineering, Department of Electronics, Carleton University, Ottawa, ON Canada consisting of 214-pages (Jun. 2011).

* cited by examiner

RADIO FREQUENCY DIGITAL FILTER GROUP DELAY MISMATCH REDUCTION

TECHNICAL FIELD

The present invention relates to wireless communications, and in particular to achieving group delay mismatch reduction in a radio frequency (RF) front end.

BACKGROUND

Filtering in the RF front end of a base station, e.g., a Long Term Evolution (LTE) eNodeB, has demanding requirements that include high-order filtering, high dynamic range, and low loss. Conventional RF front end filters for base station transceivers are high order band pass filters constructed with multiple high quality resonators. These filters are not electronically reconfigurable and are relatively bulky. With the adoption of multiple antennas and transceiver architectures, it is desirable that these RF front end filters be reduced in size. Further, vendors of base stations must offer front end filtering systems that operate in frequencies that their customers use. This results in a large ensemble of potential filter specifications. If the filters of an RF front end were reconfigurable, then a single RF front end could meet the frequency specifications of multiple customers and/or multiple standards. Further, a cognitive radio—a radio that adapts to its environment—requires frequency agility.

Continuous-time (analog) filters employ RLC (resistor-inductor-capacitor) resonators with tunable reactive components. Many of these filters exhibit low Q. Other filters use high Q components but their integration degrades the overall Q of the filter. Some filters use switches to connect or disconnect high Q components, but these filters have limited reconfigurability and tend to have high insertion loss.

Discrete time filters typically have multiple paths, where each path has a different time delay and complex gain. Some digital filters use tunable phase shifters, attenuators, or vector modulators in each path. High-order analog discrete-time filtering requires a large number of paths, each path having frequency dependent behavior which drifts with environment and age. Further, high-order filtering requires many wideband splitters and combiners. The monitoring circuitry for compensating the drift, the RF delays for each path, and the splitters and combiners occupy much physical space.

Figure 1:
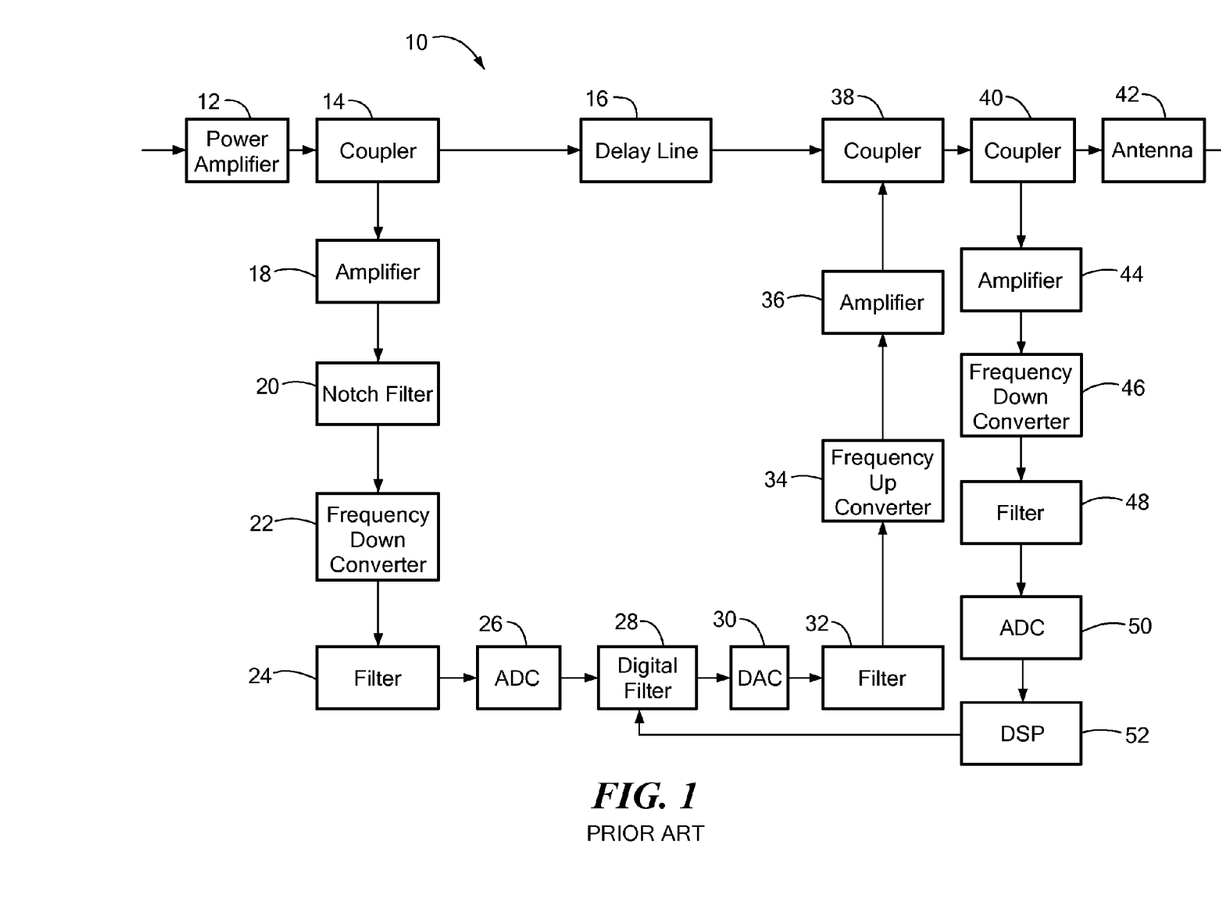
FIG. 1 is a block diagram of a known transmitter front end.

An exemplary known frequency agile RF front end is shown in FIG. 1. FIG. 1 shows an RF feed forward (FF) transmitter 10 that includes a power amplifier 12 that provides an information signal to a first coupler 14. The transmitter of FIG. 1 has a digital signal processing (DSP) path in parallel with an RF path. The RF path includes a delay line 16 to provide a delay that is comparable to a delay associated with the DSP path. The DSP path includes an amplifier 18, a notch filter 20, a frequency down converter 22, a low pass filter 24, an analog-to-digital converter (ADC) 26, a digital filter 28, a digital-to-analog converter (DAC) 30, a low pass filter 32, a frequency up converter 34, and an amplifier 36. A function of the DSP FF path is to suppress the in-band components of the signal so that when the signal in the DSP FF path is added to the signal in the RF path, out-of-band components of the signal will cancel and in-band components of the signal will be passed to an antenna 42.

The output of the amplifier 36 is input to a coupler 38 which also receives the output of the delay line 16. Ideally, signals outside an RF pass band are suppressed by cancellation in the coupler 38. The output of the coupler 38 is input to a next coupler 40 which couples the RF signal to an antenna 42. The coupler 40 also couples the RF signal to a feedback path. The feedback path includes an amplifier 44, a frequency down converter 46, a filter 48, an ADC 50, and a digital signal processor (DSP) 52. A function of the feedback path is to provide adaptation of the coefficients of the digital filter 28 based on the output of the coupler 38 which combines the signals of the RF FF path and the DSP FF path.

In a feed forward (FF) architecture such as that shown in FIG. 1, the attenuation bandwidth is limited by the group delay mismatch between the two FF paths. The group delay of the RF FF path is substantially equal to the delay of the delay line 16. The group delay of the DSP FF path is the sum of the group delays of the RF and analog components in the path, as well as the pipeline latencies within the digital components, including the ADC 26, digital filter 28 and DAC 30.

A typical group delay of the DSP FF path of FIG. 1 may be on the order of 50-100 nanoseconds over the operating bandwidth of the front end 10. One solution to correct the mismatch between the two FF paths is to increase the delay of the delay line 16. For example, inserting about 7.8 meters of coaxial cable can be expected to reduce the delay mismatch by about 37 nanoseconds. Problems with this solution are that the long delay line adds costs, consumes space and has an insertion loss that increases with length.

What is desired is a reconfigurable compact filter that can perform high order filtering while meeting typical bandwidth and insertion loss constraints in a base station front end.

SUMMARY

The present invention advantageously provides a method and system for achieving group delay mismatch reduction in a radio frequency (RF) front end. According to one aspect, the invention provides a first feed forward path and a second feed forward path. The second feed forward path is electrically in parallel with the first feed forward. The second feed forward path has a first signal path and a second signal path. The first and second signal paths are arranged to be electrically in parallel. The first signal path has a digital filter. The second signal path has a tunable analog filter. The tunable analog filter operates to reduce a delay associated with the second feed forward path as compared with a delay associated with the first feed forward path.

According to another aspect, the invention provides an RF receiver that includes a first RF coupling device that couples an RF signal received from an antenna into a first feed forward (FF) path and a second FF path. The second FF path has a splitter that splits a signal received from the first RF coupling device to a first signal path and a second signal path. The first signal path has an adaptive digital filter. The second signal path is electrically in parallel with the first signal path. The second signal path has a tunable analog filter to reduce a delay associated with the second FF path as compared to a delay associated with the first FF path. The second FF path also includes a combiner to combine signals from the first signal path and the second signal path. The RF receiver further includes a second RF coupling path that couples a signal of the second FF path with a signal of the first FF path to produce an RF output signal.

According to another aspect, the invention provides an RF transmitter that includes a first RF coupler that couples RF energy from a power amplifier to a first FF path and a second FF path. The first FF path has a delay. The second FF path has a splitter and a combiner. The splitter splits a signal on the second FF path into a first signal path and a second signal path. The first signal path has a digital filter. The second signal path has a tunable analog filter that is tunable to reduce a delay associated with the second FF path as compared to a delay associated with the first FF path. The combiner combines the signals from the first signal path and the second signal path. The RF transmitter includes a second RF coupler to combine a signal of the second FF path with a signal of the first FF path to produce an RF output signal.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Before describing in detail exemplary embodiments that are in accordance with the present invention, it is noted that the embodiments reside primarily in combinations of apparatus components and processing steps related to improving attenuation characteristics of a Radio Frequency (RF) front end in a wireless communication system, such as an LTE system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 2:
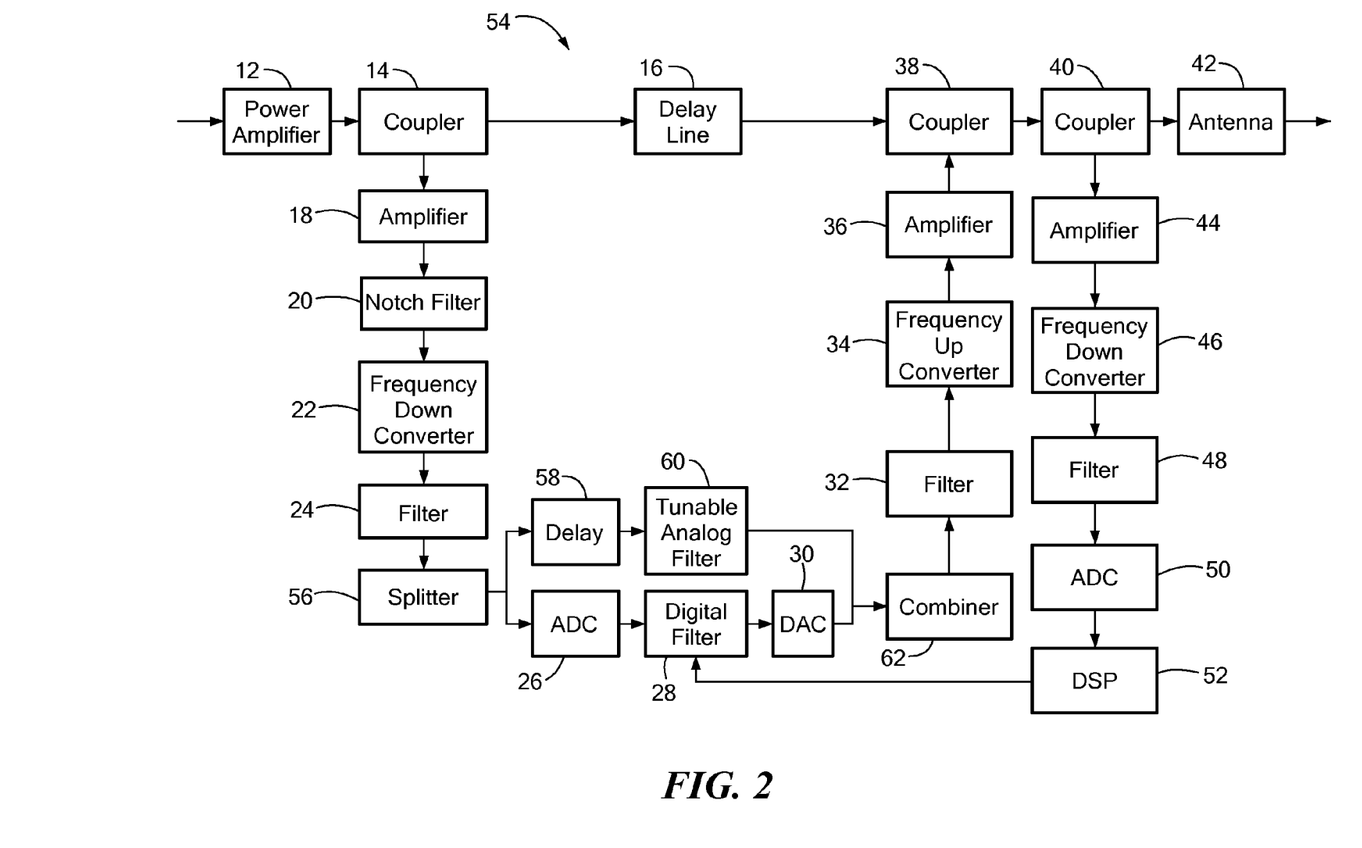
FIG. 2 is a block diagram of an exemplary transmitter front end constructed in accordance with principles of the present invention.

Referring now to the drawing figures, in which like reference designators denote like elements, there is shown in FIG. 2 a diagram of an exemplary frequency agile RF transmitter front end, generally denoted as transmitter "54". The transmitter 54 has two electrically parallel signal paths as part of the DSP feed forward (FF) path. Accordingly, in the DSP FF path of the transmitter 54, a splitter 56 splits the output of the filter 24 into two paths: a first signal path that includes the digital filter 28, and a second signal path that includes a delay element 58 and a tunable analog filter 60. The two signal paths are combined by a combiner 62. As is explained below, the combination of the tunable analog filter 60 and the delay 58 reduces a delay associated with the second FF path so that a mismatch between the RF FF path and the DSP FF path is reduced.

Figure 3:
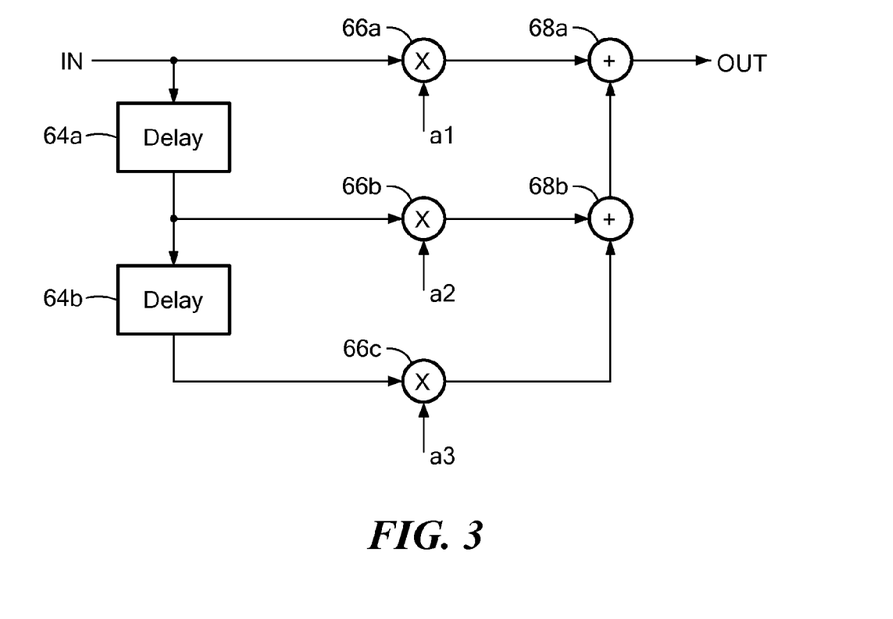
FIG. 3 is a block diagram of an exemplary tunable analog filter constructed according to principles of the present invention.

One exemplary embodiment of the tunable analog filter 60 is an FIR filter shown in FIG. 3. The tunable analog filter of FIG. 3 has two delays 64a and 64b (referred to collectively as "delays 64"). The tunable analog filter 60 also has three taps a1, a2, and a3 input into multipliers 66a, 66b and 66c, respectively, where the multipliers are referred to collectively as "multipliers 66". The tunable analog filter 60 also has two adders 68a and 68b (referred to collectively as "adders 68"). The multiplier coefficients a1, a2 and a3 in the tunable analog filter 60 may be varied so that the entire transmitter 54 is reconfigurable to different frequency bands. The delays 64 may be implemented by delay lines or switched components. The multipliers 66 and the adders 68 may be implemented by operational amplifier circuits. Alternatively, multipliers in the analog domain can be performed by vector modulators or variable gain amplifiers and phase shifters. Further, the digital signal processor (DSP) 52 may provide values of the taps a1, a2 and a3 based on the feedback received by the DSP 52. Although three taps are shown in FIG. 3, more or fewer taps may be implemented. Consequently, more or fewer delay lines, multipliers and adders may be implemented based on design parameters and requirements.

Figure 4:
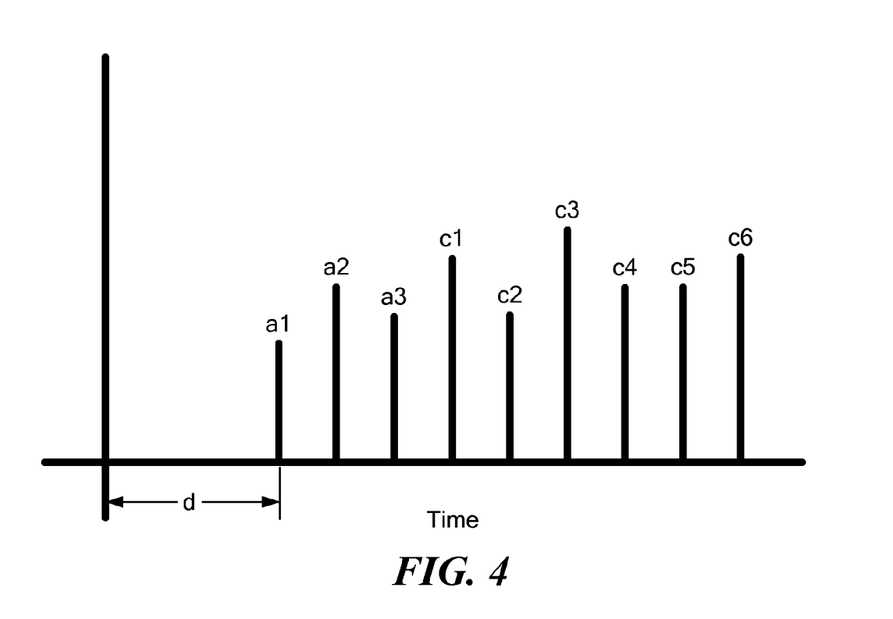
FIG. 4 is a diagram of an impulse response of a tunable analog filter and an adaptive digital filter.

A function of the delay element 58 is to allow the impulse responses of the tunable analog filter 60 and the digital filter 28 to be offset in time. The delay may be set so that the last non-zero value of the impulse response of the tunable analog filter 60 occurs one digital clock period before the first non-zero value of the impulse response of the digital filter 28. In such an embodiment, the delays 64 of the tunable analog filter 60 should be equal to the digital clock period. This timing is shown in FIG. 4, where d is the delay of the delay element 58, a1, a2, and a3 are the impulse response of the tunable analog filter 60 and c1, c2, c3, c4, c5, and c6 are the impulse response of the digital filter 28. Because fewer leading zeros are included in the combination of the two impulse responses, a smaller group delay is achieved. This allows a shorter delay line 16 to be used to match the delay of the DSP path. Persons of skill in the art will readily recognize that higher or lower order filters may be implemented.

Figure 5:
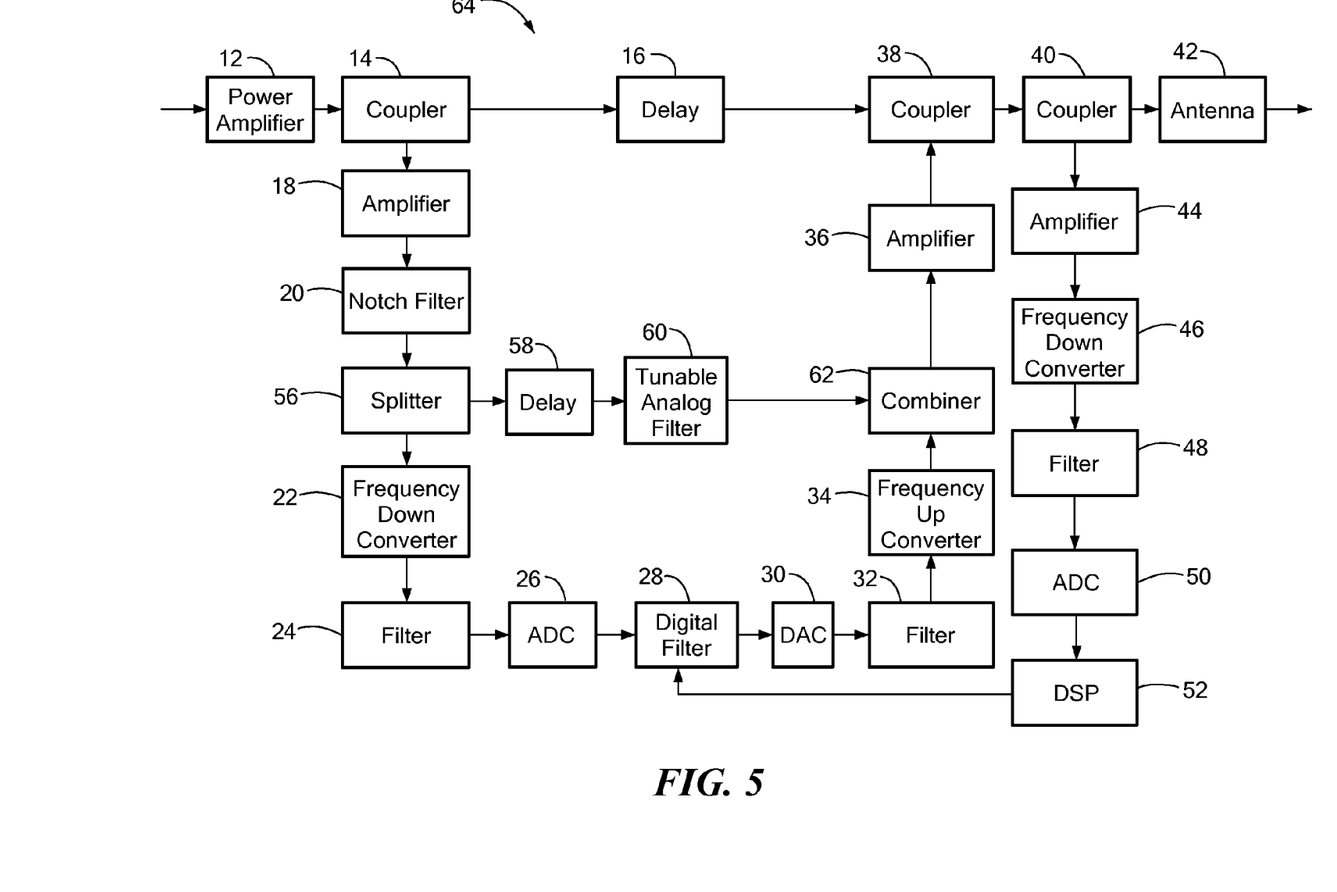
FIG. 5 is a diagram of an alternative embodiment of a transmitter front end constructed in accordance with principles of the present invention.

In FIG. 2, the tunable analog filter 60 operates at baseband by virtue of the signal path containing the splitter 56 being after the frequency down converter 22. FIG. 5 shows an exemplary RF front end transmitter 64 constructed in accordance with principles of the present invention. In the embodiment of FIG. 5, the tunable analog filter 68 operates at RF, rather than at baseband, by virtue of the splitter 56 being positioned before the frequency down converter 22.

Thus, in one embodiment, the tunable analog filter 60 provides filtering at baseband. In another embodiment, the tunable analog filter 60 provides filtering at radio frequencies. A delay device 58 may be placed in electrical series with the tunable analog filter. The delay device 58 may be adjusted to offset a delay between an impulse response of the tunable analog filter 60 and an impulse response of the digital filter 28. The delay provided by the delay device 58 may be adjusted so that a last non-zero value of the impulse response of the tunable analog filter 60 occurs one digital clock period before the first non-zero value of the impulse response of the digital filter 28. The digital filter 28 is adaptive and has coefficients based on a feedback signal resulting from a combination of signals from the RF FF path and the DSP FF path. In some embodiments, a band stop filter or notch filter may be used in the DSP FF path to substantially reject signals substantially at a center frequency of a signal of the DSP FF path.

Persons of ordinary skill in the art will readily recognize that the tunable analog filter 60 is not limited solely to the FIR system of FIG. 3. Other tunable discrete time systems such as infinite impulse response filters or tunable continuous time filters may be used. Tunable continuous time filters may include electromagnetic resonators with tunable components such as varactors.

Figure 6:
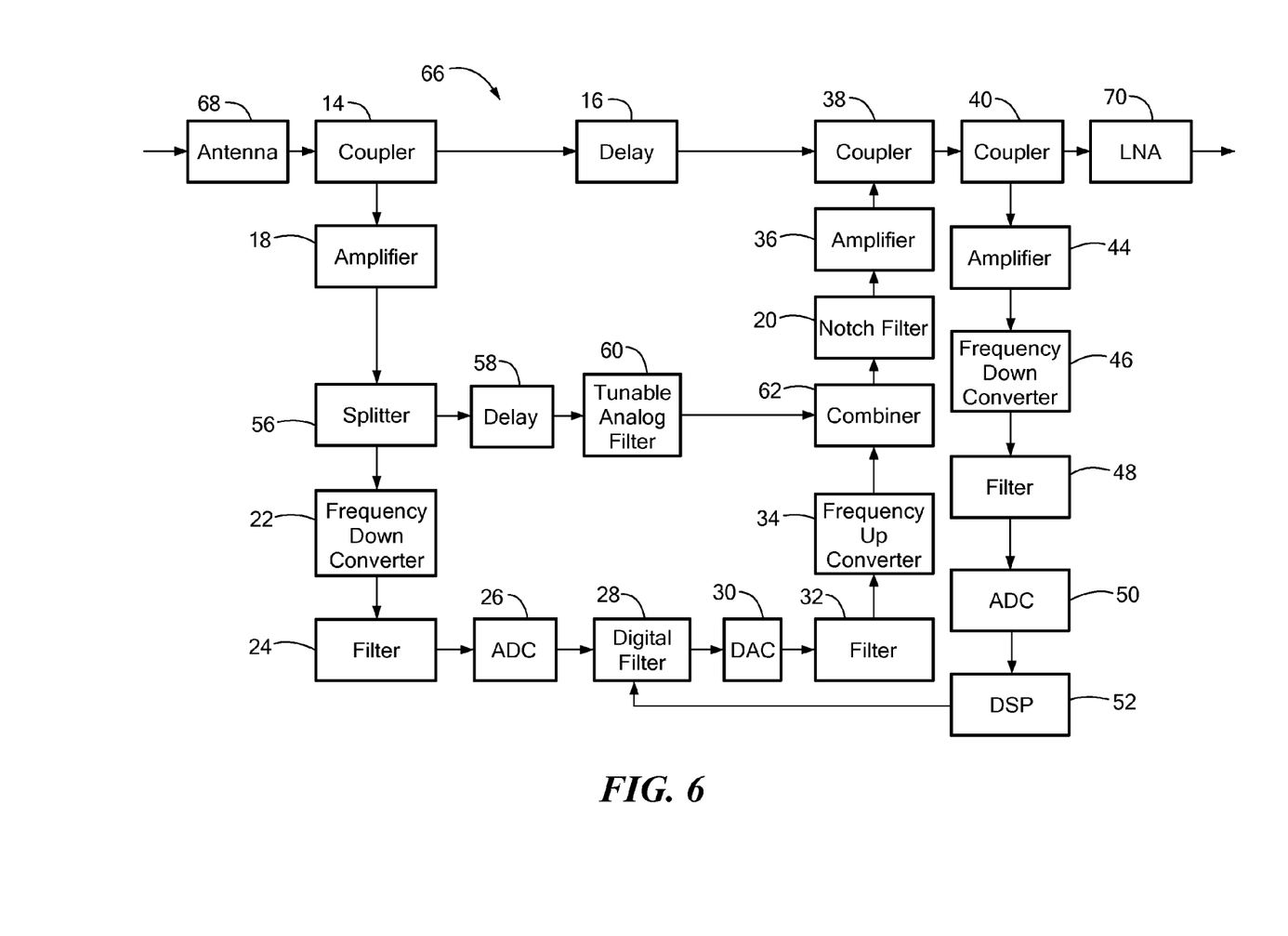
FIG. 6 is a diagram of an exemplary receiver front end constructed in accordance with principles of the present invention.

FIG. 6 is a diagram of another exemplary RF front end receiver 66. The receiver 66 receives an information signal from an antenna 68 and inputs the signal to the coupler 14. The coupler 14 couples the signal to the RF delay 16 and to the DSP FF path that includes the digital filter 28 and the tunable analog filter 60. Note also that the signal path containing the tunable analog filter 60 could be implemented at baseband if the splitter 56 were placed after the frequency down converter 22 and if the combiner 62 were placed before the frequency up converter 34. The RF output of the coupler 40 is input to a low noise amplifier 70.

Thus, embodiments reduce the group delay of a feed forward (FF) path having digital components. Reducing this group delay reduces the group delay mismatch between the RF FF path and the DSP FF path. Reducing the group delay mismatch improves the attenuation bandwidth of the filter's stop bands, thereby permitting the filter to better attenuate wideband signals. Further, adding the branch having the tunable analog filter 60 permits increased latency in the signal path having the digital filter 28. If the digital component latency constraints are relaxed by addition of the signal path having the tunable analog filter 60, then other performance metrics, such as reduced power consumption, can be achieved. Further, adding the branch having the tunable analog filter 60 reduces the length of the delay line 16, thereby conserving physical space and cost.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A radio frequency, RF, filter, the RF filter having:
   a first feed forward path having a delay line;
   a second feed forward path, the first and second feed forward path arranged to be electrically in parallel, the second feed forward path having:
   a splitter configured to provide a first signal path and a second signal path, the first and second signal paths arranged to be electrically in parallel;
   a digital filter in the first signal path of the second feed forward path;
   a tunable analog filter in the second signal path of the second feed forward path;
   a delay device electrically in series with the tunable analog filter, a delay of the delay device being adjustable, the tunable analog filter and the delay device combining to reduce a difference between a delay of the first signal path and a delay of the second signal path; and
   a combiner arranged to combine outputs of the first signal path and the second signal path.

2. The RF filter of claim 1, wherein the tunable analog filter provides filtering at baseband.

3. The RF filter of claim 1, wherein the delay of the delay device is adjusted to offset a delay between an impulse response of the tunable analog filter and an impulse response of the digital filter.

4. A radio frequency, RF, filter, the RF filter having:
   a first feed forward path having a delay line;
   a second feed forward path, the first and second feed forward path arranged to be electrically in parallel, the second feed forward path having:
   a splitter configured to provide a first signal path and a second signal path, the first and second signal paths arranged to be electrically in parallel; and
   a digital filter in the first signal path of the second feed forward path;
   a tunable analog filter in the second signal path of the second feed forward path; and
   a delay device in the second signal path of the second feed forward path, the delay device being coupled in an electrically series arrangement with the tunable analog filter, a delay of the delay device being adjusted to offset a delay between an impulse response of the tunable analog filter and an impulse response of the digital filter, the delay being adjusted so that a last non-zero value of the impulse response of the tunable analog filter occurs one digital clock period before the first non-zero value of the impulse response of the digital filter.

5. The RF filter of claim 1, wherein the digital filter is adaptive and has coefficients based on feedback from a signal resulting from a combination of signals from the first feed forward path and the second feed forward path.

6. The RF filter of claim 1, further comprising a band stop filter in the second feed forward path, the band stop filter suppressing signals in proximity to a center frequency of a signal of the second feed forward path.

7. A radio frequency, RF, receiver, comprising:
   a first RF coupling device, the first RF coupling device coupling a RF signal received from an antenna into a first feed forward path, the first feed forward path having a first delay, and a second feed forward path, the second feed forward path having:
   a splitter, the splitter splitting a signal on an input path of the second feed forward path to:
   a first signal path, the first signal path having an adaptive digital filter; and
   a second signal path, the second signal path being electrically in parallel with the first signal path, the second signal path having a tunable analog filter and a delay device electrically in series with the tunable analog filter, the delay device having an adjustable delay, the tunable analog filter and the delay device combining to reduce a difference between a delay of the first signal path and a delay of the second signal path; and a combiner, the combiner combining signals from the first signal path and the second signal path; and a second RF coupling device, the second RF coupling device coupling a signal of the second feed forward path with a signal of the first feed forward path to produce an RF output signal.

8. The RF receiver of claim 7, further comprising:

a digital signal processor, the digital signal processor providing filter coefficients for the adaptive digital filter, the filter coefficients based on samples of the RF output signal.

9. The RF receiver of claim 8, the digital signal processor further providing coefficients for the tunable analog filter.

10. The RF receiver of claim 7, further comprising a band stop filter in the second feed forward path, the band stop filter arranged to suppress signals in proximity to a center frequency of the signal of the second feed forward path.

11. A radio frequency, RF, transmitter, comprising:

a first RF coupler, the first RF coupler coupling RF energy from a power amplifier to a first feed forward path and a second feed forward path, the first feed forward path including a delay, the second feed forward path including:

a splitter, the splitter splitting a signal of the second feed forward path to:

a first signal path, the first signal path having a digital filter; and a second signal path, the second signal path having a tunable analog filter and a delay device electrically in series with the tunable analog filter, the delay device having an adjustable delay, the tunable analog filter and the delay device combining to reduce a difference between a delay of the first signal path and a delay of the second signal path; and a combiner, the combiner combining signals from the first signal path and the second signal path; and a second RF coupler, the second RF coupler device coupling a signal of the second feed forward path with a signal of the first feed forward path to produce an RF output signal.

12. The RF transmitter of claim 11, further comprising:

a third RF coupling device, the third RF coupling device feeding back a portion of the RF output signal;

an analog to digital converter, the analog to digital converter converting the feedback to a digital signal;

a digital signal processor, the digital signal processor producing a plurality of coefficients of the digital filter based on samples of the digital signal.

13. The RF transmitter of claim 11, wherein the tunable analog filter operates at baseband.

14. The RF filter of claim 1, wherein the tunable filter is dynamically tunable during operation of the RF filter.

15. The RF filter of claim 14, wherein the tunable filter is dynamically tunable during operation by dynamically adjusting tap values of the tunable filter based on feedback from a digital signal processor.

16. The RF receiver of claim 7, wherein the tunable filter is dynamically tunable during operation of the RF receiver.

17. The RF transmitter of claim 11, wherein the tunable filter is dynamically tunable during operation of the RF transmitter.

* * * * *